United States Patent [19]
Griwatz et al.

[11] 3,880,626
[45] Apr. 29, 1975

[54] DEVICE FOR SEPARATING LIQUID FROM A GAS STREAM

[75] Inventors: Gunther H. Griwatz, Mars; Jack L. Bicehouse, Renfrew, both of Pa.

[73] Assignee: Mine Safety Appliances Company, Pittsburgh, Pa.

[22] Filed: May 1, 1974

[21] Appl. No.: 465,769

Related U.S. Application Data

[63] Continuation of Ser. No. 227,988, Feb. 22, 1972, abandoned.

[52] U.S. Cl. ............ 55/485; 55/487; 55/497; 55/525; 55/527; 55/DIG. 25
[51] Int. Cl. ............................................ B01d 39/10
[58] Field of Search ............ 55/497, 521, 485–487, 55/514, 524–528, DIG. 25; 161/89; 252/88

[56] References Cited
UNITED STATES PATENTS

| | | | |
|---|---|---|---|
| 931,014 | 8/1909 | McGerry | 55/521 X |
| 1,147,279 | 7/1915 | Sweetland | 55/525 X |
| 2,394,208 | 2/1946 | Schaaf | 55/514 X |
| 2,822,059 | 2/1958 | Lunn et al. | 55/487 |
| 2,945,557 | 7/1960 | Powers | 55/514 X |
| 3,005,516 | 10/1961 | Klein | 55/514 X |
| 3,246,455 | 4/1966 | Boddy | 55/319 |
| 3,280,542 | 10/1966 | Heijnis | 55/487 X |
| 3,521,429 | 7/1970 | Leffler | 55/527 X |
| 3,606,737 | 9/1971 | Lefevre | 55/DIG. 25 |
| 3,616,617 | 11/1971 | De Groote | 55/DIG. 25 |

FOREIGN PATENTS OR APPLICATIONS

| | | | |
|---|---|---|---|
| 544,296 | 4/1942 | United Kingdom | 55/487 |

*Primary Examiner*—Frank W. Lutter
*Assistant Examiner*—Kathleen J. Prunner
*Attorney, Agent, or Firm*—Brown, Murray, Flick & Peckham

[57] ABSTRACT

An upright frame is provided, through which a substantially horizontally flowing stream of gas containing liquid particles can flow. Mounted on edge in the frame are three porous transverse sections disposed face-to-face. The upstream section contains at least one transverse sheet of fine wire mesh disposed face-to-face, the middle section is formed of material for agglomerating fine liquid particles into larger particles and the downstream section contains a plurality of transverse sheets of fine wire mesh disposed face-to-face. Large liquid particles are removed by the first section, and agglomerated particles that do not drain out of the middle are stopped by the downstream section. The liquid draining down the three sections escapes from drain holes in the bottom of the frame.

2 Claims, 4 Drawing Figures

PATENTED APR 29 1975 3,880,626

DEVICE FOR SEPARATING LIQUID FROM A GAS STREAM

This application is a continuation of our pending patent application, Ser. No. 227,988, filed Feb. 22, 1972 and now abandoned.

There are situations in which it is necessary to separate or remove from a gas stream liquid particles entrained in it. Heretofore, this has generally been attempted where the gas stream is flowing vertically, but whether vertical or horizontal, removal of liquid from the stream has been poor and has required additional provision for removing the liquid from the stream in the downstream duct. Undesirably long ducts also have been required. Moreover, considerable pressure drop has resulted, which of course is undesirable.

It is among the objects of this invention to provide a liquid-separation device which is more efficient than those known heretofore, which requires a smaller pressure drop, which is very short in the direction of gas flow and which has a relatively long life.

The preferred embodiment of the invention is illustrated in the accompanying drawings, in which FIG. 1 is a rear or downstream end view;

Figure 2:
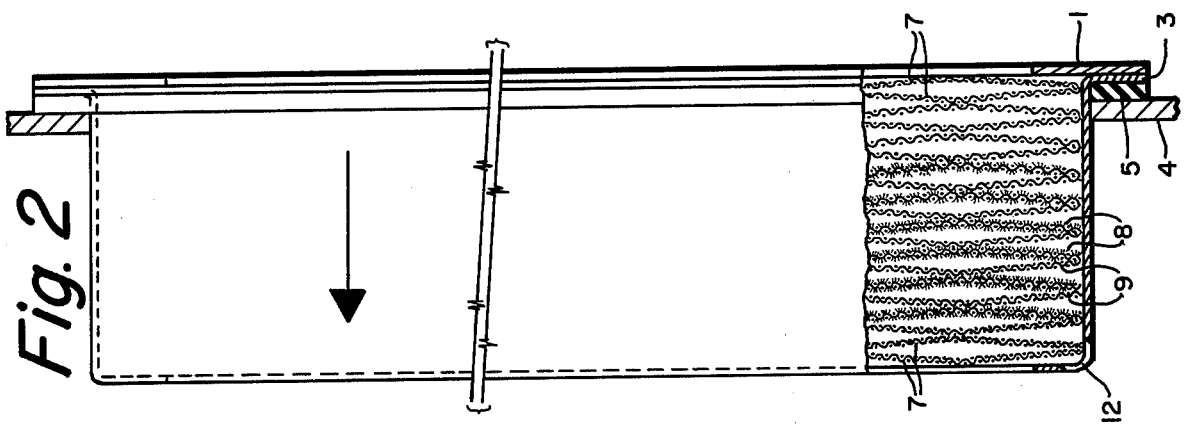
FIG. 2 is a side view, partly in section, taken on the line II—II of FIG. 1.
Figure 1:
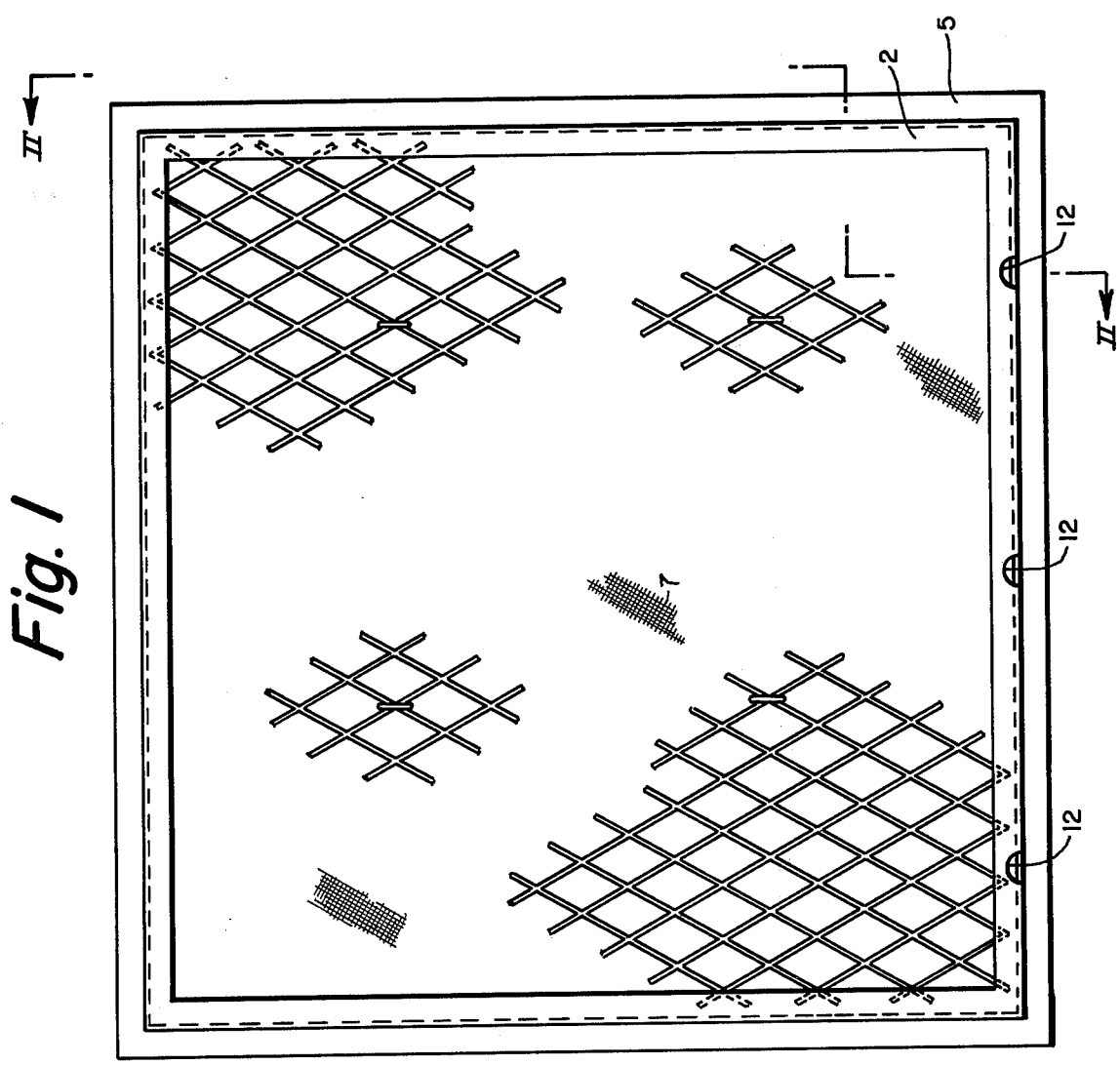

Referring to FIGS. 1 and 2 of the drawings, a rectangular frame has inwardly directed flanges 1 and 2 at its opposite ends. The frame also is surrounded by a flange 3 at its upstream end and is designed to fit in an opening in a wall 4 or the like, through which flows a gas stream laden with moisture in the form of liquid particles entrained in it. A gasket 5 is disposed between flanges 3 and the wall. The frame is filled with material for separating the moisture or liquid from the gas stream. This material is in three porous sections that extend transversely of the frame and are disposed face-to-face within it, with their edges snugly engaging the surrounding frame.

Figure 4:
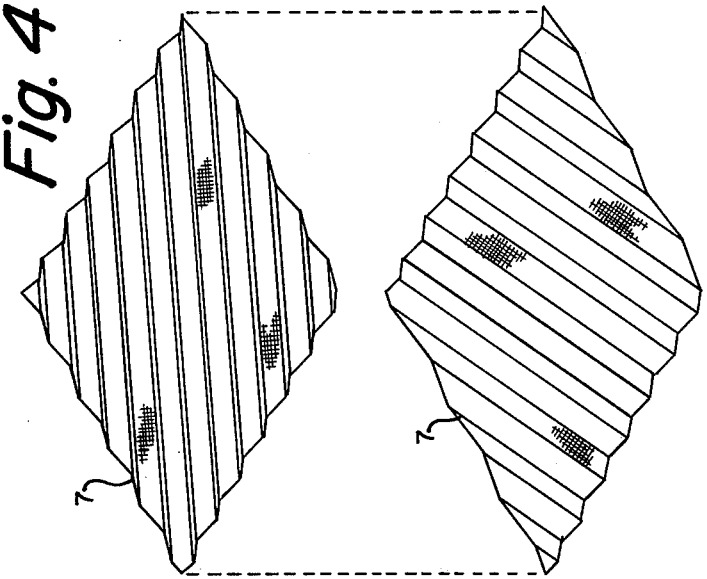
FIG. 4 is an exploded fragmentary perspective view showing how the crimped sheets cross each other.
Figure 3:
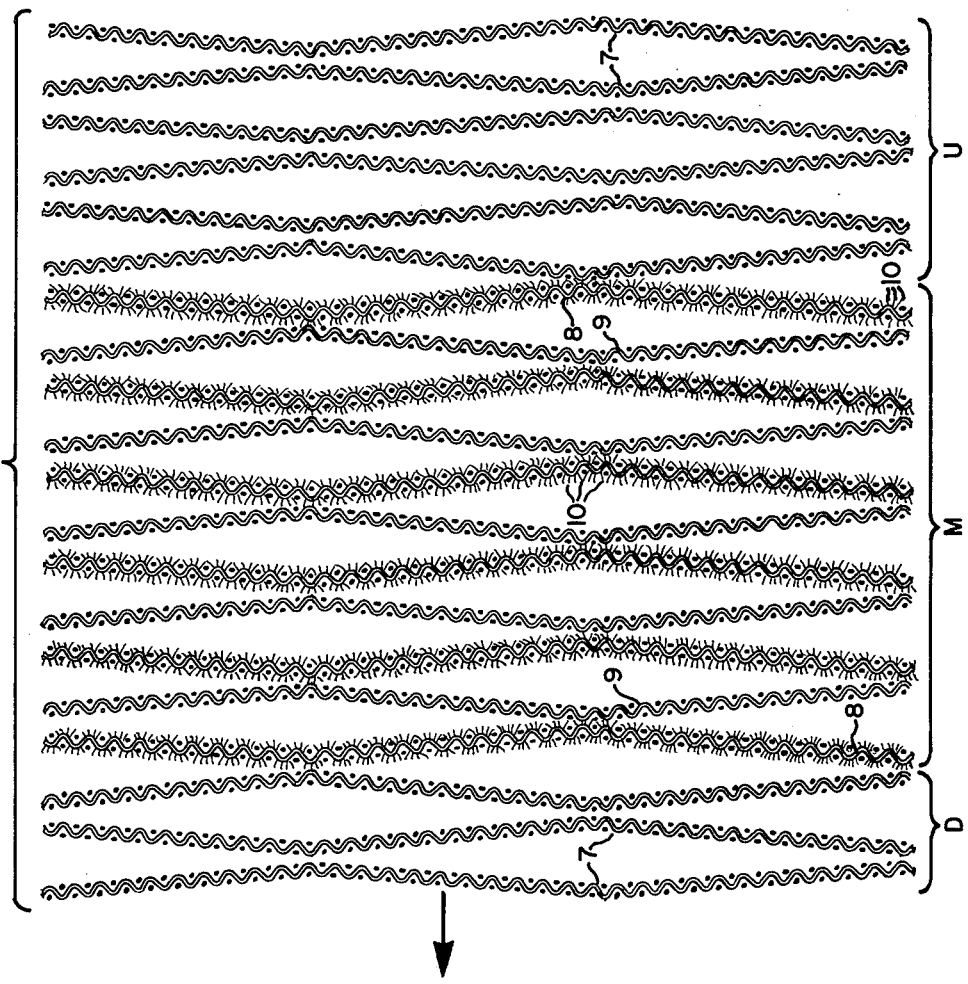
FIG. 3 is a greatly enlarged fragmentary horizontal section of liquid-separating material.

The three sections consist of upstream and downstream sections U and D separated by a middle section M, as indicated in FIG. 3. The downstream section is formed from a plurality of transverse sheets 7 of wire mesh disposed face-to-face. If the stream is lightly loaded with moisture, only one sheet may be required for the upstream section, but the heavier the liquid loading the more sheets that should be used. Generally, there are approximately six to eight sheets in the upstream section and from three to eight sheets in the downstream section. Each sheet preferably is woven from stainless steel wire having a diameter of approximately 0.011 inch, and each sheet is provided with from six to eight openings per linear inch. As shown in FIGS. 3 and 4, each sheet is crimped to provide it with approximately two crimps per inch, each having a depth of around one-quarter inch. The crimp angle desirably is about 30°. The crimps, that is, the crests of the crimps, extend up and down across the sheets but not vertically. They may be disposed at about a 30° angle to the vertical. Alternate sheets are reversed so that the crests of crimps on adjoining sheets engage one another but cross as shown in FIG. 4, so that the sheets will not nest. This crimping of the sheets also stiffens them and provides spaces between them. It also promotes drainage as liquid can run down the sides of the crimps.

The middle section M in the frame is formed from a material that will agglomerate the smaller liquid particles that are not stopped by the upstream section U but pass through it. This agglomeration forms these smaller liquid particles into larger particles. Although the middle section can be formed from a plurality of sheets like those just described for the other two sections, but of finer mesh, it is preferred for performance reasons to make the middle section from a plurality of fibrous sheets 8 that are separated by crimped wire mesh sheets 9. The separating sheets 9 can be the same mesh as those in the upstream and downstream sections. Each fibrous sheet is woven from stainless steel wire and glass or plastic filament. The wire preferably is about one-half the diameter of the wire used in the other sheets, being about 0.006 inch in diameter. The other filament is still finer, being about 0.0004 inch in diameter. A glass filament has been used, twisted from 816 finer filaments, which has been found very satisfactory. The openings in sheets 8 are smaller than those in the sheets in the two end sections of the device. The glass or plastic filament breaks and splits at the opposite faces of the wire mesh to form a great multiplicity of tiny fibers, the ends 10 of which project like fuzz from those surfaces as shown in FIG. 3. These fibrous sheets 8 likewise are crimped in substantially the same manner as the wire mesh sheets first described. There may be 5 to 15 fibrous sheets.

As a stream of gas laden with liquid particles flows through this device the larger particles are stopped or trapped by the wire mesh sheets in the upstream section U. After these particles are deposited on these sheets 7 they run down the crimps until they reach the bottom of the frame. Smaller liquid particles in the gas stream will pass through this upstream section but as the stream flows through the middle section M they will be caught by the wire mesh and plastic fibers or fuzz therein and will be agglomerated into larger particles. Most of these larger particles will drain downwardly to the bottom of the frame, but the rest will be carried out of the back of the middle section and will enter the downstream section D where they will be deposited on the wire mesh sheets 7 forming that section, down which they will drain to the bottom of the frame. The liquid thus forming in the bottom of the frame by drainage from all three sections escapes through drain holes 12 provided in the bottom of the frame at its downstream end.

With a device constructed as disclosed herein, about 99 per cent of mixed liquid particles from less than 1 micron in size to greater than 1,000 microns are removed from the gas stream. At the same time, the pressure drop across the device is only about one inch of water when the gas stream approaching the device is flowing at 400 feet per minute.

According to the provisions of the patent statutes, we have explained the principle of our invention and have illustrated and described what we now consider to represent its best embodiment. However, we desire to have it understood, that, within the scope of the appended claims, the invention may be practiced otherwise than as specifically illustrated and described.

We claim:

1. A liquid-separation device adapted to be placed across a substantially horizontally flowing stream of gas containing liquid particles that are to be removed from the stream, the device comprising an upright frame with a substantially horizontal passage therethrough through which said stream can flow, and three porous transverse liquid-trapping sections in said frame mounted on edge across said passage and disposed face-to-face therein with spaces between them, the upstream section containing approximately six to eight transverse sheets of fine wire mesh with spaces between them, the middle section being formed from a plurality of transverse fibrous sheets separated by wire mesh sheets with spaces between these fibrous and mesh sheets for agglomerating smaller liquid particles that pass said upstream section into larger particles, the downstream section containing approximately three to eight transverse sheets of fine wire mesh with spaces between them, said wire mesh sheets of the upstream and downstream sections being provided with from six to eight openings per linear inch, the openings through said middle section fibrous sheets being smaller than the openings in the sheets in the upstream and downstream sections, and the bottom of said frame having a drain for escape of liquid draining from said sections.

2. A liquid-separation device according to claim 1, in which each of said fibrous sheets includes a wire mesh sheet in which non-metallic fibers are interwoven, and ends of said fibers project in the form of fuzz from the opposite sides of their supporting mesh sheets.

* * * * *